US005404287A

United States Patent [19]
Poumey

[11] Patent Number: 5,404,287
[45] Date of Patent: Apr. 4, 1995

[54] DEVICE FOR REGULATING THE INTENSITY OF THE ELECTRIC CURRENT IN A RECEIVER

[75] Inventor: Michel Poumey, Ecully, France

[73] Assignee: Gaz de Bordeaux, France

[21] Appl. No.: 11,945

[22] Filed: Feb. 1, 1993

[30] Foreign Application Priority Data

Feb. 14, 1992 [FR] France .................... 92 01900

[51] Int. Cl.6 ........................................ H02M 5/453
[52] U.S. Cl. ............................ 363/21; 363/37; 363/97; 363/131
[58] Field of Search ............ 363/21, 37, 97, 131, 363/132; 315/200 R

[56] References Cited

U.S. PATENT DOCUMENTS

| 4,748,381 | 5/1988 | Ganser et al. | 315/200 R |
| 4,785,387 | 11/1988 | Lee et al. | 363/21 |
| 4,980,663 | 12/1990 | Moyer | 334/8 |
| 5,208,432 | 5/1993 | Han | 219/10.55 B |
| 5,227,964 | 7/1993 | Furuhata | 363/56 |

FOREIGN PATENT DOCUMENTS 0224301 11/1986 European Pat. Off. .

OTHER PUBLICATIONS

IEEE 1991 Int. Conf. On Consumer Electronics, Jun. 5, 1991 Rosemont, USA pp. 60–61.

*Primary Examiner*—Steven L. Stephan
*Assistant Examiner*—Adolf Berhane
*Attorney, Agent, or Firm*—Harris Beach & Wilcox

[57] ABSTRACT

A device for regulating the intensity of an electric current in a receiver has a primary circuit containing a rectifier bridge connected across the terminals of a main power supply, thus defining a positive terminal and a negative terminal on the bridge after rectification. The positive and negative terminals are connected in series to a high-speed on/off switch and a parallel resonant circuit. The parallel resonant circuit includes an inductor and a capacitor connected in parallel. The device also includes a secondary circuit coupled magnetically to the primary circuit. The secondary circuit is connected in series with the receiver whose intensity it is desired to regulate.

7 Claims, 3 Drawing Sheets

DEVICE FOR REGULATING THE INTENSITY OF THE ELECTRIC CURRENT IN A RECEIVER

BACKGROUND OF THE INVENTION

1. Field of the Invention

The invention relates in general to a device making it possible to regulate the intensity of the electric current traversing a receiver, and more particularly to regulating the current in an incandescent lamp.

2. Description of the Prior Art

Conventionally, lighting regulators, also known as dimmers, operate according to the principle of the chopping of the sinusoid of the AC current distributed. As is known, the current of the mains supply is a sinusoidal AC current, of frequency 50 or 60 Hertz depending on the country, and of voltage 220 to 240 volts, or 110 to 120 volts.

This chopping of the sinusoid is achieved by means of a triac or two associated thyristors mounted in series with the lamp or the receiver in question, the circuit thus formed being closed across the terminals of the AC supply voltage. In fact, this triac cuts the current which traverses the filament of the lamp in time with the period of the current. This principle of cutting known as "phase monitor" makes it possible to achieve good regulation of light intensity, from almost 0 to 100% of the latter. In fact, to obtain a very low light intensity, close to 0, the closing of the triac is controlled with a phase lag of almost 180° with respect to the voltage. To obtain a light intensity half the maximum light intensity, the closure of the triac is undertaken with a phase lag of 90° with respect to the voltage, and finally to obtain maximum illumination, the triac is permanently closed. In fact, it is appreciated that such a method, which is simple to embody and inexpensive, makes it possible easily to control lamps up to powers of 1,000 Watts.

Nevertheless, it has various disadvantages. Firstly, there is no electrical isolation between the lamp and the main power supply, resulting in the need to earth the metallic parts of the controlled lamp. Now, in domestic usage, the earth sockets are not distributed throughout the dwelling.

Furthermore, with such a device, the lamp is subject directly to the main voltage. Hence, this type of supply cannot operate with low-voltage lamps, such as in particular 12 volt halogen lamps, widely available for domestic usage.

Finally, the shape of the electric current which traverses the filament of the lamp is not sinusoidal, bearing in mind the chopping performed by the triac, and the fast variations in the intensity of this current when closing the controlled on/off switch cause interference as well as harmonics of the frequency of the supply voltage. The latter phenomena "pollute" electricity distribution networks all the more since, on the one hand, the numbers of regulators of this kind are growing rapidly and, on the other hand, the unit powers of the lamps thus controlled have increased with the significant spread of 220 volt halogen lamps. This "pollution" may prove troublesome for certain types of domestic electrical appliances, such as in particular television sets, washing machines, ovens, etc., comprising electronic control and monitoring circuits.

Objects and Summary of the Invention

The object of the invention is to provide a device for regulating the electric current in a receiver, and in particular in a lamp, overcoming all the disadvantages mentioned above, and Just as readily implemented as that of the devices known hitherto.

This device for regulating the intensity of an electric current in a receiver (3), comprises:

- a primary circuit containing a rectifier bridge, connected across the terminals of the any main AC power supply, defining a positive terminal and a negative terminal after rectification, with which terminals are mounted in series, on the one hand, a high-speed on/off switch and, on the other hand, a parallel resonant circuit, comprising in parallel an inductor and a capacitor;
- a secondary circuit incorporating in series the receiver whose intensity it is desired to regulate.

According to the invention, the secondary circuit is coupled magnetically to the primary circuit, in the absence of any magnetic circuit, the secondary circuit incorporating for this purpose an inductor $L''$ connected across the terminals of the said receiver.

"Magnetic coupling" is understood, within the sense of the invention, to mean coupling in air, in the absence of any magnetic circuit such as for example soft iron core, ferrite, or analogous device of a transformer etc.

In other words, the invention provides a device for regulating intensity which, owing to the magnetic coupling between the circuit supplying the receiver and the circuit connected directly across the terminals of the main power supply, allows operation at very high frequencies, typically between 25 and 100 kilohertz, thereby overcoming all the disadvantages of the devices known hitherto, and making it possible moreover to use lamps or other receivers of any operating voltage, something which could not be done hitherto. This new type of regulator advantageously makes it possible to regulate the intensity of the electric current traversing incandescent lamps as well as resistors and electric motors.

In this embodiment of the invention, the magnetic coupling is performed directly by means of the inductance of the primary circuit, coupled magnetically with an inductance mounted in series with the secondary circuit.

According to an advantageous embodiment of the invention, the secondary circuit contains in parallel a capacitor, the values of the inductor and of the capacitor of this secondary circuit being matched to resonate at the operating frequency of the primary circuit, in such a way as to transmit maximum power to the receiver.

Advantageously, the high-speed on/off switch is of the semiconductor type. It is associated with a circuit governing its opening and closing, consisting of, on the one hand, a synchronising circuit, on the other hand a monostable circuit of the "timer" type, and finally of a circuit for controlling the effective closing time of the said on/off switch. In this case, the primary circuit contains a diode shunted with respect to the on/off switch and the passing direction of which is defined from the negative pole to the positive pole of the rectifier bridge.

Advantageously, the primary circuit contains in parallel a capacitor, intended to filter the high-frequency components of the supply current, in particular to avoid any risk of transferring these components to the main power supply.

In another embodiment of the invention, this capacitor is positioned in parallel, ahead of the rectifier bridge, that is to say between the rectifier bridge and the AC current supply terminals.

According to another embodiment of the invention, the secondary circuit contains in parallel a rectifier bridge, across the terminals of which is mounted a receiver of the electric motor type, a capacitor being mounted in parallel with the said motor.

DESCRIPTION OF THE DRAWINGS

The manner in which the invention may be embodied, and the ensuing advantages will emerge better from the illustrative embodiments which follow, given by way of non-limiting indication and based on the attached figures, in which.

DESCRIPTION OF THE PREFERRED EMBODIMENTS

Figure 1:
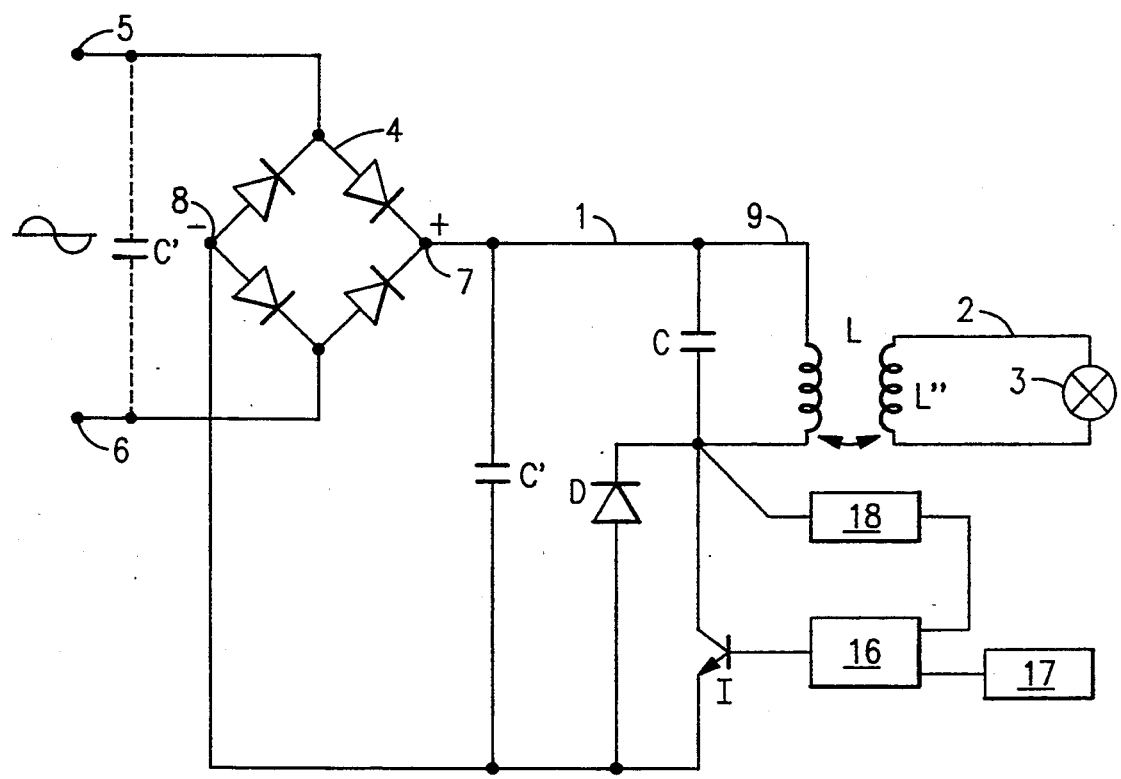
FIG. 1 is a schematic representation of the electric circuit of a device according to the invention.

The simplified electrical diagram of a device for regulating intensity according to the invention has been represented in FIG. 1. This device contains two circuits, namely firstly a primary circuit (1) connected across the terminals (5,6) of the electrical supply voltage, and a secondary circuit (2), containing in series the receiver, and in this instance an incandescent lamp (3), the illumination of which it is desired to regulate.

The primary circuit (1) includes firstly, connected directly across the terminals (5,6) of the sinusoidal AC supply, a rectifier bridge (4) containing four diodes which are mounted so as to rectify the current output by the bridge and do so in a known manner. In fact, there are defined at (7) and (8) respectively a positive terminal and a negative terminal after rectification. With these terminals (7) and (8) are mounted in series firstly an anti-resonant circuit (9) consisting of an inductor L and a capacitor C which are mounted in parallel, and a high-speed on/off switch I. Typically, the latter may consist of a mechanical on/off switch, the opening and closing of which are ensured by means of a relay with electromagnet. Nevertheless, when it is desired to regulate the closing time of this on/off switch I over a wider range, and in particular when it is desired to significantly reduce this time d, it proves more advantageous to resort to an on/off switch of the semiconductor type.

Such a high-speed on/off switch can consist of a bipolar transistor, or according to the MOS FET, or otherwise IGBT . . . technology, well known for their application to high-speed opening and closing of a circuit. In a known manner, the closing and opening of such a high-speed on/off switch I are performed by means of an independent monostable circuit, commonly known within the relevant field by the expression "timer", that is to say an electronic circuit which acts on the control electrode of this on/off switch. This monostable circuit (16) is furthermore under the supervision of a synchronising circuit (18), intended to detect the variation in a quantity, and, in this instance, to detect the passing of the voltage across the terminals of the on/off switch I to zero, then inducing, through the monostable circuit (16), the closure of the latter. Finally, the closing time d of the on/ off switch I is adjusted by means of a control circuit (17) which in fact governs the operating time of the monostable circuit (16). This control circuit can in particular consist of any transducer, able to convert a physical parameter into an electrical signal. Typically, it can consist of a potentiometer or even pushbuttons or equivalent devices.

Furthermore, the use of an on/off switch of the semiconductor type in relation with this device entails the use of a diode D mounted in parallel with the on/off switch I, the passing direction of this diode going from the negative terminal (8) to the positive terminal (7) of the rectifier bridge (4). The role of the diode D will be described in relation with the operation of the device of the invention.

According to the invention, the device also contains a secondary circuit (2) coupled magnetically in air, as will be described later, with the primary circuit (1) at the level of the resonant circuit (9). This secondary circuit (2) contains in series the receiver and in particular the lamp (3), the illumination of which it is desired to regulate.

The operation of the circuit according to the invention will now be described in greater detail. To the terminals of the rectifier bridge (4), is delivered a periodic, and no longer alternating current whose period is half the period of the AC main supply current. The on/off switch I enables the resonant circuit (9) to be supplied according to a specified sequencing. In fact, the closing time d of this on/off switch is altered in order to regulate the current traversing the inductor L of the resonant circuit (9). Thus, when I is closed, the electric current which flows in the inductor L grows linearly, bearing in mind the well known Law of variation of the intensity in an inductor.

Then, when the on/off switch I is opened, by command of the monostable (16), the time of variation of which is itself dependent on the control circuit (17), the inductor L, which is charged during the preceding half-period discharges in the form of an oscillating discharge, into the capacitor C, inducing a decrease in the current in the latter, its obliteration and change of direction according to the shape of a sinusoid of period and hence of frequency dependent on the characteristics of C and of L. Then, the on/off switch I is reclosed, by command of the monostable (16) and of the synchronising circuit (18) which has detected the passing of the voltage across the terminals of I to zero, and a new linear growth of intensity in the inductor L is observed and so on.

Figure 3:
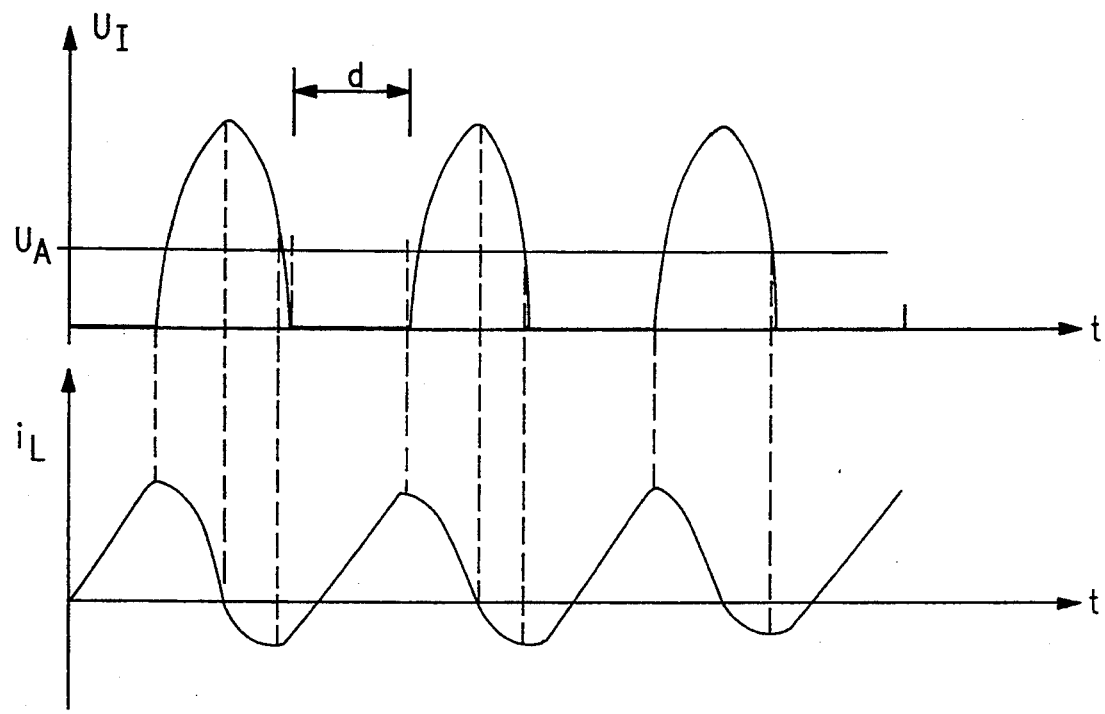
FIG. 3 is a schematic representation of the variation of respectively the voltage across the terminals of the on/off switch and of the intensity in the inductor of the primary circuit as a function of time.

The variation in the intensity $I_L$ in the inductor L can be observed in FIG. 3, where the variation in the voltage $U_I$ across the terminals of the on/off switch I, where the supply voltage $U_A$ appears, has also been represented. It is clearly observed that when the on/off switch is closed, the voltage across its terminals then becoming zero, a region is observed of linear increasing portion of the variation in intensity in the inductor L. By contrast, once the on/off switch I is open, a sinusoidal decrease is observed in the intensity in L.

In fact, it is observed that the variation in intensity in the inductor L is near-sinusoidal and that its frequency is related to the natural frequency of the oscillating circuit (9), and to the closing time d during which the voltage across the terminals of the on/off switch I is zero. In fact, the current which traverses L, magnetically coupled with the inductor L" of the secondary circuit (2), induces eddy currents in this inductor, whose frequency is equal to that of the primary resonant circuit (9). Thus, the current which flows in the lamp (3) has the same frequency and the same shape as the current traversing the inductor L.

By virtue of this magnetic coupling in air, or in any medium of magnetic permeability equal to 1, the use of iron or ferrite is avoided, bearing in mind the high operating frequency of the anti-resonant circuit (9). Indeed, at the aforementioned operating frequencies there is no longer any reason to introduce an intermediary of the ferrite type. This characteristic has the advantage of saving on a generally expensive, high-frequency iron or ferrite transformer.

Advantageously, the circuit operates at high frequency, typically of between 25 and 100 kilohertz, so as to minimise the size of the components L, L" and C. This operation at such frequencies also has the advantage that, bearing in mind the higher skin effect, which in known manner is observed when an electric current traverses a conductor, the current flows mainly at the surface of the filament, the centre of the latter thereby remaining colder and thus capable of operating at higher temperatures than for lower frequencies, typically of 50 and 60 Hertz. In other words, bearing in mind the use of these high frequencies, for the same luminous efficiency, the consumption can be reduced by a factor of 20 to 30%.

The variation in brightness will therefore be dependent on the closing time d of the on/off switch I. Indeed, referring to FIG. 3, and bearing in mind the foregoing developments, it is clearly appreciated that the intensity of the current which traverses the inductor L and in consequence the lamp (3) will be all the higher the more prolonged the linear portion of the variation in intensity in the said inductor, and hence the greater the closing time of the on/off switch I. In fact, the smaller this time d and the lower the current in the inductor L, the lower, consequently, will be the brightness of the lamp. By contrast, the greater is d, the greater will be the brightness of the lamp.

Actually, with respect to the 50 or 60 Hz AC main power supply, operation occurs as if the value of the effective resistance of the lamp varied with the variation in the time d obtained through action on the control circuit (18) for opening the on/off switch I.

In fact, the 50 or 60 Hertz current wave of the main power supply remains a sinusoid not misshapen by harmonics.

Furthermore, the 25 to 100 kilohertz high-frequency component of the supply current, created by the current inrushes during actuations of the high-speed on/off switch I, is filtered by a capacitor C', positioned in parallel ahead of or behind the rectifier bridge (4). In fact, no harmonics or interference are observed on the main power supply, with all the consequences already specified in the preamble. Indeed, its capacitance is chosen so as not to create any filter effect on the main frequency, but merely on the high frequencies of the resonant circuit (9).

The diode D, mounted in parallel with the semiconductor on/off switch I, is intended to enable the electric current to flow from the start of closure of the on/off switch I. Indeed, at that moment, the intensity traversing the L having changed direction, is negative, it is important to be able to close the circuit and position a diode D whose passing direction goes from the − terminal (8) to the + terminal (7) of the rectifier bridge (4) in order to be able to complete the circuit.

Figure 4:
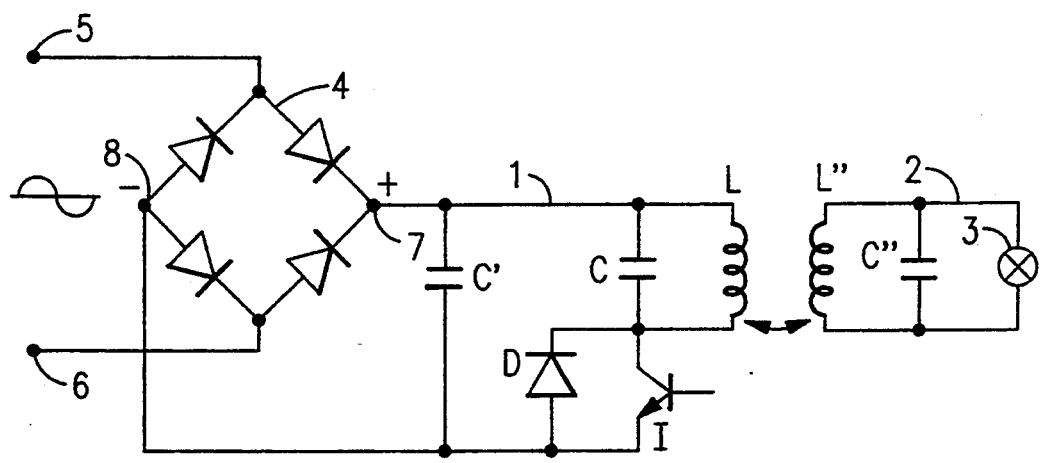
FIG. 4 is a schematic representation of the circuit of another embodiment of the invention.

According to another embodiment also represented in FIG. 4, and so as to increase the power of the lamp, the secondary circuit (2) can advantageously be equipped with a capacitor C" mounted in parallel with the inductor L" and the lamp (3), so as to form a second resonant circuit. If the resonant frequency of this second circuit is substantially equal to that of the primary circuit, the power transferred to the lamp is optimal, this being in a known manner. The advantage of using a second resonant circuit lies in the fact that the two inductors L and L", that is to say the distance of the magnetic coupling, can be set further apart and in consequence the electrical insulation between the lamp and the supply voltage can be increased. Thereby, insulation of several kilovolts or even several tens of kilovolts can be obtained whilst transferring adequate power to the lamp.

Figure 5:
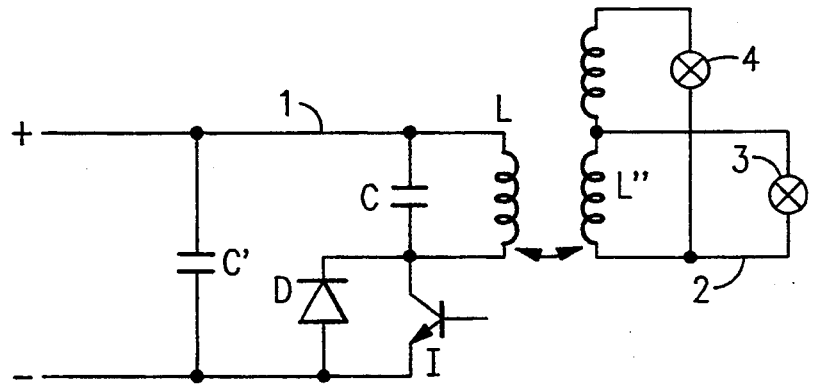
FIG. 5 is another representation of the circuit of the invention.

In FIG. 5 a set-up equivalent to the previous one has been represented, in which the secondary circuit actually contains two shunted circuits capable of supplying two lamps (3) and (4). To do this either a double secondary winding or an output socket is produced thus capable of simultaneously supplying a 12 volt lamp and a 220 volt lamp with the same regulation device.

Owing to the use of the primary oscillating circuit, this regulation device is insensitive to the extreme variations in the values of the resistance of the lamp. Thereby, if the lamp is short-circuited, the inductor L limits only the value of the current taken up on the supply to a value close to zero. The exchange of oscillatory energy between the capacitor C and the inductor L takes place almost without loss, that is to say without active energy: the oscillating circuit (9) is in a reactive state, the main supply (5,6) not offsetting the energy loss from the capacitor C, and hence not providing any energy.

Moreover, if the lamp is disconnected, the active energy involved is virtually zero and the current taken up on the supply has a value close to zero. Hence, it is appreciated that with this type of regulation device, there is no need to place a protective fuse in series with the 50 or 60 Hertz supply, the operation adapting to the value of the resistance of the lamp without any danger of deterioration.

The power involved may vary by large amounts, depending on the sizing of the components L, C, I, L", C". In practice, regulators are obtained of some ten Watts, possibly reaching several kilowatts, typically 3.5 kilowatts for example on a 230 volt 16 ampere power socket.

Figure 6:
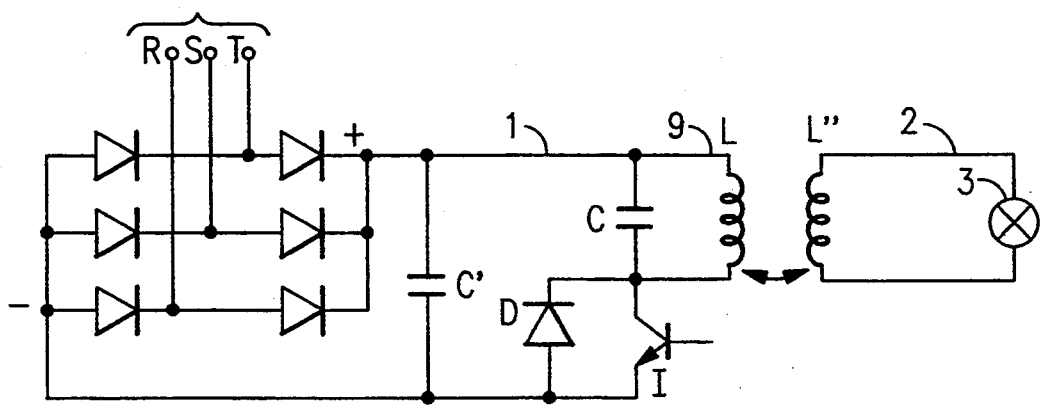
FIG. 6 is a schematic representation of the electric circuit for a three-phase supply.

It is also possible with a three-phase supply equipped with a six-diode rectifier, to obtain powers greater than 3.5 kilowatts, such as has been represented in FIG. 6 and by sizing the previously described components accordingly. It is in particular possible to obtain more power without however penalising the current of the chosen phase.

Figure 2:
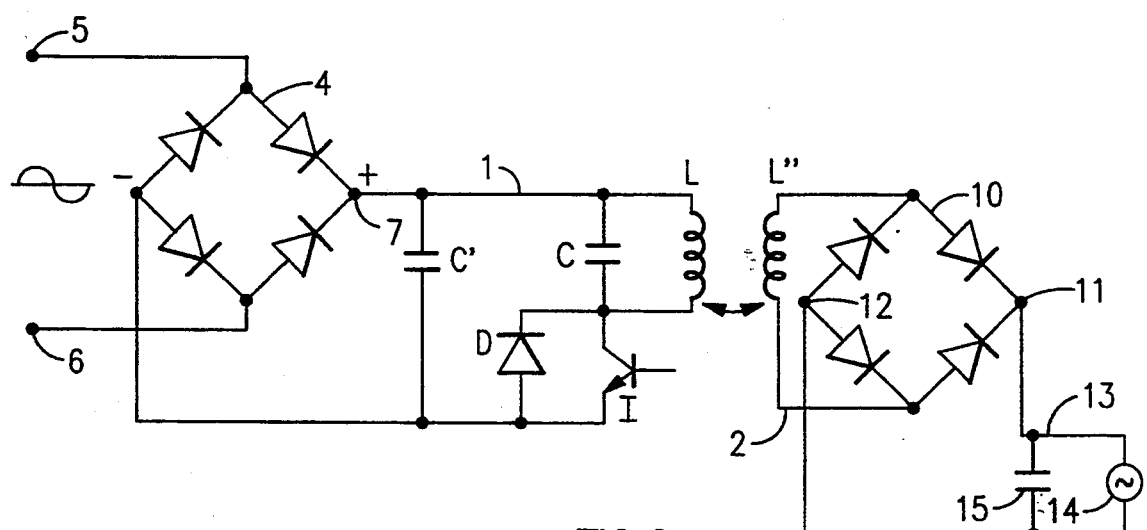
FIG. 2 is another representation of the invention, in which the receiver consists of an electric motor.

In a variant embodiment of the invention, represented in FIG. 2, a rectifier bridge (10) consisting, like the primary circuit, of four diodes, and defining respectively a positive terminal (11) and a negative terminal (12) after rectification, is placed across the terminals of the secondary circuit (2). Across these terminals (11,12) is then mounted an electric motor, of the universal motor type (14), with which is shunted a capacitor (15). A tertiary circuit (13) is thereby defined, the intensity of which can be regulated in the same manner as those described earlier, and hence the speed of rotation of the said motor (14) of which can be regulated.

Thus, it is possible with the device according to the invention, to regulate the intensity of the electric current in any type of receiver, both active and reactive, without however acting on the frequency of the main power supply, and in complete safety, bearing in mind the special structure of the electrical circuit of this device.

I claim:

1. A device for regulating the intensity of an electric current in a receiver, comprising:

a primary circuit containing a first rectifier bridge connected across the terminals of a main power supply thereby defining a positive terminal and a negative terminal on said first rectifier bridge after rectification, said positive and negative terminals of said first rectifier bridge being connected in series to a high-speed on/off switch and a parallel resonant circuit, said resonant circuit including in parallel a first inductor and a first capacitor, said on/off switch being a semiconductor switch capable of being closed for a predetermined amount of time d, said time d being governed by a monostable circuit and a synchronizing circuit, said synchronizing circuit controlling the triggering of said monostable circuit upon detection of a threshold value, said time d further being dependant on a control circuit for receiving input data to set said predetermined amount of time d within a preselected range;

a secondary circuit containing the receiver and a second inductor connected across the terminals of the receiver, said first and second inductors being proximate each other so that said secondary circuit is magnetically coupled to said primary circuit in the absence of any magnetic circuit.

2. The device according to claim 1 wherein power delivered to said secondary circuit is governed by the predetermined closing time d of said semi-conductor switch.

3. The device according to claim 1 wherein said secondary circuit further includes a capacitor connected in parallel with said second inductor, the values of the secondary circuit capacitor and second inductor being matched so that said secondary circuit resonates at the operating frequency of said primary circuit in such a manner as to transmit maximum power to the receiver.

4. The device according to claim 1 wherein said primary circuit further includes a second capacitor being shunt-mounted to filter high-frequency components generated by said parallel resonant circuit thereby avoiding any risk of transferring these high-frequency components to the main power supply.

5. The device according to claim 4 wherein said second capacitor of the primary circuit is connected in parallel between either said positive and negative terminals of said first rectifier bridge or between the terminals of the main power supply.

6. The device according to claim 1 wherein said secondary circuit further includes a second rectifier bridge having a positive terminal and a negative terminal after rectification, a third capacitor, and a motor, said third capacitor and motor being connected in parallel across said positive and negative terminals of said second rectifier bridge.

7. The device according to claim 1 wherein said threshold value is a predetermined value of the voltage across the terminals of said semi-conductor switch.

* * * * *